United States Patent [19]

Konya et al.

[11] Patent Number: 5,679,464
[45] Date of Patent: Oct. 21, 1997

[54] JOINED PRODUCT OF HEAT-RESISTING ALLOYS AND METHOD FOR JOINING HEAT-RESISTING ALLOYS

[75] Inventors: Shogo Konya; Akira Okamoto, both of Sakai, Japan

[73] Assignee: Nippon Steel Corporation, Tokyo, Japan

[21] Appl. No.: 150,162

[22] PCT Filed: Mar. 31, 1993

[86] PCT No.: PCT/JP93/00407

§ 371 Date: Nov. 30, 1993

§ 102(e) Date: Nov. 30, 1993

[87] PCT Pub. No.: WO93/20017

PCT Pub. Date: Oct. 14, 1993

[30] Foreign Application Priority Data

Mar. 31, 1992 [JP] Japan .................. 4-076519

[51] Int. Cl.⁶ .................. B32B 9/00
[52] U.S. Cl. .................. 428/469; 428/472; 428/621; 428/622; 428/629; 428/630; 428/631; 428/633; 427/190; 427/193; 427/201; 228/119; 228/198; 228/234.3
[58] Field of Search .................. 428/469, 472, 428/621, 622, 629, 630, 631, 633; 422/177, 180, 181; 427/190, 193, 201; 228/118, 198, 234.3

[56] References Cited

U.S. PATENT DOCUMENTS

| | | | |
|---|---|---|---|
| 2,437,212 | 3/1948 | Schottland | 428/633 |
| 2,671,746 | 3/1954 | Brew | 428/630 |
| 2,771,969 | 11/1956 | Brownlow | 428/633 |
| 3,144,370 | 8/1964 | Bennett et al. | 156/89 |
| 3,700,420 | 10/1972 | Bristow | 428/633 |
| 3,975,165 | 8/1976 | Elbert | 428/633 |
| 4,072,797 | 2/1978 | Gass | 428/472 |
| 4,149,910 | 4/1979 | Popplewell | 148/276 |
| 4,471,017 | 9/1984 | Poeschel | 428/472 |
| 4,698,271 | 10/1987 | Moorhead | 428/472 |
| 4,852,789 | 8/1989 | Pond, Sr. | 228/198 |
| 4,881,681 | 11/1989 | Pond, Sr. | 228/198 |
| 5,006,414 | 11/1989 | Pond, Sr. | 428/469 |
| 5,009,360 | 4/1991 | Reisman | 228/198 |
| 5,340,014 | 8/1994 | Sekhar | 228/198 |

FOREIGN PATENT DOCUMENTS

| | | |
|---|---|---|
| 1071696 | 9/1954 | France . |
| 49-36810 | 10/1974 | Japan . |
| 51-130416 | 11/1976 | Japan . |
| 58-95673 | 6/1983 | Japan . |
| 59-14678 | 4/1984 | Japan . |
| 63-203779 | 8/1988 | Japan . |
| 63-312985 | 12/1988 | Japan . |
| 1-141834 | 6/1989 | Japan . |
| 2-97686 | 4/1990 | Japan . |
| 2-97687 | 4/1990 | Japan . |
| 946859 | 4/1960 | United Kingdom . |

OTHER PUBLICATIONS

*Stahlschussel*, 1983, pp. 260, 324.
By the edition committee of fine ceramics molding-working and bonding technology "fine ceramics molding-working and bonding technology", Jan. 10, 1989.

*Primary Examiner*—Timothy Speer
*Attorney, Agent, or Firm*—Kenyon & Kenyon

[57] ABSTRACT

The present invention provides a joined product of heat-resisting alloys, comprising heat-resisting alloy sheets or foils optionally having an oxide film on their surfaces, said heat-resisting alloy sheets or foils being joined to each other at their surfaces facing each other with an composite having a melting point in the range of from 800° to 1400° C. The joined product of heat-resisting alloys is produced by putting the above-described composite oxide on a heat-resisting alloy in a sheet or foil form at its portion to be joined, putting another heat-resisting alloy in a sheet or foil form and heating the resulting assembly at a temperature of 9/10 or more of the melting point of the composite oxide.

20 Claims, 6 Drawing Sheets

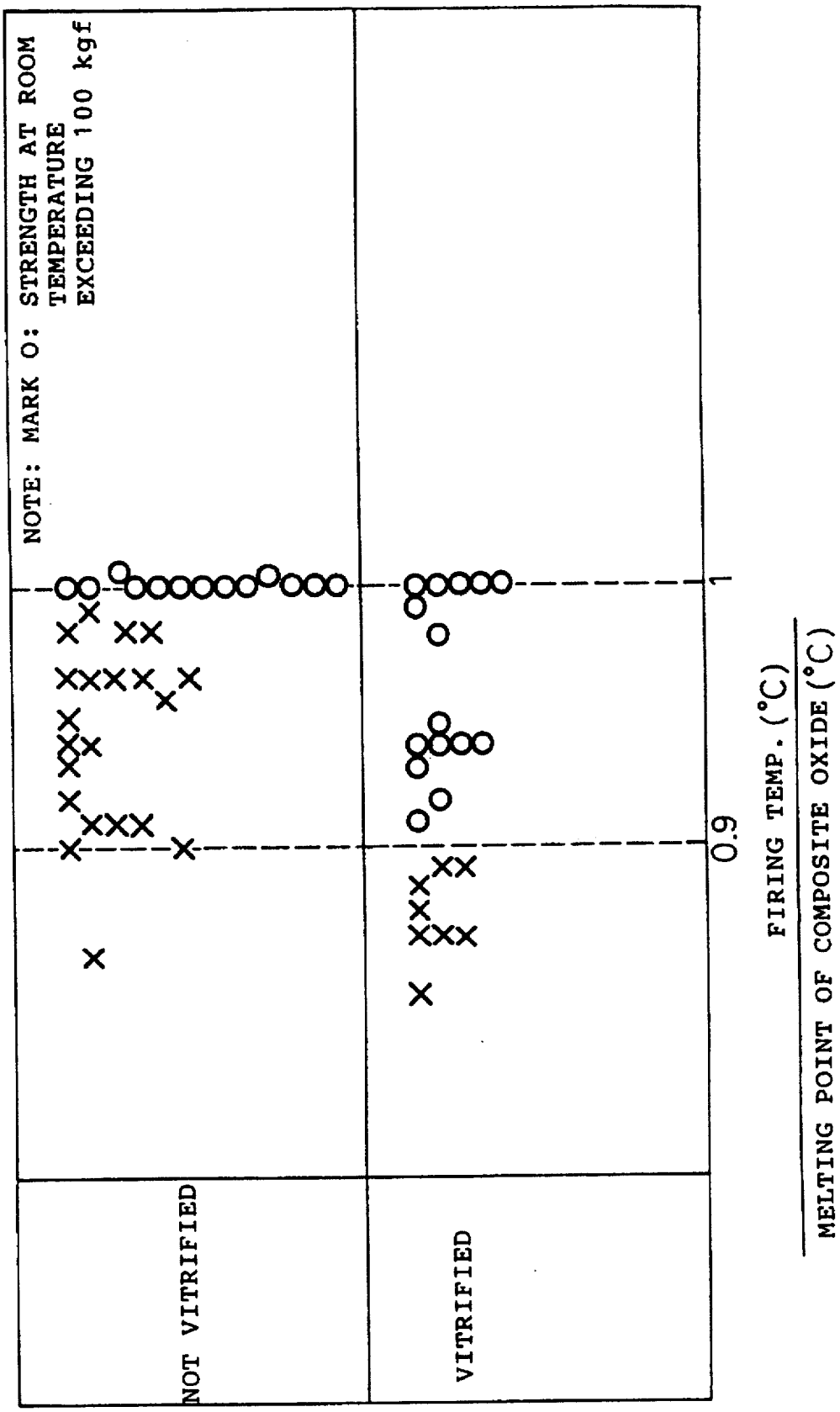

JOINED PRODUCT OF HEAT-RESISTING ALLOYS AND METHOD FOR JOINING HEAT-RESISTING ALLOYS

TECHNICAL FIELD

The present invention relates to a method for joining heat-resisting alloys and more particularly to a method for joining heat-resisting alloys required to satisfy very strict high-temperature strength, heat-cycle resistance and electrical insulation requirements, for example, in the form of metallic carriers for use in the purification of an automobile exhaust gas in a high-temperature environment with a temperature of 800° C. or above and in a heat-cycle environment.

BACKGROUND ART

Methods including the use of various organic adhesives or inorganic adhesives, brazing, welding, etc. are generally known as methods for joining heat-resisting alloys in a sheet or foil form to each other.

On the other hand, as disclosed in, for example, Japanese Unexamined Patent Publication (Kokai) Nos. 2-97686, 2-97687, 1-141834, 63-312985 and 63-203779, an enamel coating technique where an oxide layer is formed on the surface of a metal to electrically insulate the surface of the metal from the metallic substrate is also known.

In joining by the brazing and welding, however, it is impossible to make the joint electrically insulating.

If the object is to attain electrical insulation alone, use may be made of, for example, a method which comprises interposing an electrically insulating material between the heat-resisting alloys and joining the insulating material and the heat-resisting alloys to each other with an organic adhesive. Further, direct joining of heat-resisting alloys to each other with an organic adhesive by taking advantage of the electrical insulating property of the organic adhesive can also be considered. In both methods, however, since the organic adhesive has poor heat resistance, it is unsuitable for use in the high-temperature environment contemplated in the present invention.

A method which comprises interposing an insulating material between the heat-resisting alloy foils and joining the insulating material and the heat-resisting alloy foils to each other with an inorganic adhesive or a method which comprises directly joining heat-resisting alloys to each other with an inorganic adhesive by taking advantage of the electrical-insulating property of the inorganic adhesive can provide heat-resistance in the joint. In these methods, however, when the joined product is subjected to heat-cycling, cracking occurs within the adhesive, which finally results in fractures, so that the problem of heat-cycle resistance cannot be solved. That is, the object of the present invention could not be attained also by the methods using an organic or inorganic adhesive.

On the other hand, the above-described enamel coating technique is based on a technical idea for attaining electrical insulating properties and heat-cycle resistance. Since, however, this technique is basically related to a metallic surface treatment, the technique, as such, cannot be applied to the present invention directed to joining of metals to each other.

An object of the present invention is to provide a method for joining heat-resisting alloys in a sheet or foil form, wherein the resultant joint can simultaneously satisfy four property requirement in an environment in which a metallic carrier is used in the purification of an automobile exhaust gas. The properties are, a high-temperature strength sufficient to withstand a temperature of 800° C., a heat-cycle resistance sufficint to withstand a repeated heat-cycle from room temperature to 800° C., a sufficint-joining strength at room temperature, and electrical insulation between the heat-resisting alloys.

CONSTRUCTION OF INVENTION

In the present invention, in order to attain the above-described object, oxides of at least two elements selected from the group consisting of the group Ia elements, group IIa elements, group IIIa elements, group IVa elements, group Va elements, group VIa elements, group VIIa elements, group VIII elements excluding Rh, Pd, Ir and Pt, group Ib elements excluding Ag and Au, group IIb elements excluding Hg, group IIIb elements, group IVb elements excluding C, group Vb elements excluding N, group VIb elements excluding O and S, and lanthanoid elements are selected and combined, and this composite oxide is used as a joining material for joining heat-resisting alloys in a sheet or foil form to each other.

Specifically, when the heat-resisting alloy is in the form of a metallic carrier for use in the purification of an automobile exhaust gas, the selection and combining are effected in such a manner that the joining material has a melting point of 800° C. or above so as to have a high-temperature strength and not higher than 1,400° C. so as to withstand a repeated heat-cycle from room temperature to 800° C. and, further, the joining material has an electrically insulating property.

The joining material is prepared by providing a composite oxide having the above-described properties, melting the composite oxide, homogenizing the melt, cooling and solidifying the melt, pulverizing the solid and kneading the powder with an organic vehicle to form a joining material in a paste form. Alternatively, in the stage of cooling and solidification, the melt may be formed into a joining material in a foil form.

The joining material is coated on heat-resisting alloys facing each other at their portion to be joined or alternatively interposed between these heat-resisting alloys, and the assembly is then heated to join the heat-resisting alloys to each other. Specifically, when $SiO_2$ is used as one component of the composite oxide, the composite oxide is heated to a temperature of 9/10 or more of the melting point of the composite oxide for the purpose of vitrifying the composite oxide to provide a sufficient fluidity, while when the composite oxide is free from $SiO_2$, it is heated to the melting point of the composite oxide, or a higher temperature, to melt the composite oxide. Such heating causes oxygen contained in the composite oxide to be released, and the released oxygen reacts with ingredients in the heat-resisting alloys, so that the heat-resisting alloys are firmly joined to each other.

In this connection, it should be noted that the oxides constituting the composite oxide preferably have a lower standard free energy of formation ($\Delta G$) than oxides of the elements constituting the heat-resisting alloy. This is because when use is made of a composite oxide containing as a component an oxide having a higher standard free energy of formation than an oxide of the elements constituting the heat-resisting alloy, this component is reduced by the element constituting the heat-resisting alloy to a metal that is dispersed in the heat-resisting alloy, which causes the composition of the composite oxide to be greatly deviated from the initial composition and causes a change in the melting point of the composite oxide, so that the composite oxide often does not melt at the firing temperature.

For example, when the heat-resisting alloy comprises an Fe—Cr alloy or a Ni—Cr alloy, an oxide having a higher $\Delta G$ than $Cr_2O_3$ cannot be used as a component of the composite oxide. Further, when the heat-resisting alloy comprises an Fe—Cr—Al alloy or a Ni—Al alloy, an oxide having a higher $\Delta G$ than $Al_2O_3$, i.e., $SiO_2$, cannot be used as a component of the composite oxide.

Further, the above-described joining technique can be used also when an oxide film having a high density and a high adhesion value are previously formed on the surface of the heat-resisting alloy. In this case, the joining mechanism is such that the composite oxide and the oxide film are joined to each other by a reaction therebetween, and so that the oxide film is in close contact with the heat-resisting alloy, as a result, the composite oxide and the heat-resisting alloy are joined to each other through an oxide film.

In this joining mechanism, a joined product having a high joining strength cannot be provided unless the bond strength between the oxide film and the substrate of the heat-resisting alloy is high. The present inventors have found that, in particular, alumina oxide film formed by the oxidation of an Al-containing heat-resisting alloy is very dense and has a particularly high bond strength.

In this case, since the above-described reduction phenomenon of the composite oxide can be suppressed by the oxide film, even though the oxide constituting the composite oxide does not have a lower standard free energy of formation than the oxide of the elements constituting the heat-resisting alloy, no significant change in the melting point derived from a change in the composition occurs.

The reason for this is that when no oxide film is formed, since the composite oxide is in direct contact with the heat-resisting alloy, the reduction reaction occurs in the contact portion, whereas when the oxide film is formed, since the diffusion of oxygen within the oxide film is necessary for the occurrence of the reduction reaction, the reaction rate is greatly reduced. Further, since the reduced metal is also has a low coefficient of diffusion within the oxide film, the fine grains of the metal are precipitated in a dispersed form, which gives rise to no significant change in the melting point of the composite oxide.

On the contrary, in this case, an improvement in strength at room temperature, which will be described later, can be expected, so that the precipitation of the metal in a fine grain form has a favorable effect.

The joined product is heated for a predetermined time and then forcibly cooled or allowed to stand to solidify the molten (or vitrified) composite oxide.

Although the above-described joining can provide a satisfactory strength at room temperature, a joining material formed by mixing 50% by weight or more of a composite oxide powder having a melting point of 800° to 1,400° C. with a high-melting point oxide powder having a melting point above 1,400° C. as the balance, for example, an alumina powder, and bringing the mixture to a paste form may be used for the purpose of further enhancing the strength at room temperature.

In this case, even when the mixed oxide is melted, since the high-melting point oxide remains unmelted and is dispersed in the composite oxide, the dispersed oxide inhibits cracking, which contributes to a further improvement in strength at room temperature.

Specifically, in a heat-resisting alloy having an oxide film (an alumina film) on its surface, when a further improvement in strength at room temperature is necessary, an oxide having a higher standard free energy of formation than alumina among the components constituting the composite oxide, that is, at least one oxide selected from the above-described oxides excluding oxides of Li, the group IIa elements, group IIIa elements, group IVa elements and lanthanoid elements, which have a lower standard free energy of formation, is used in the joining material. The use of this joining material causes a very small amount of oxygen contained in the composite oxide to be diffused within the heat-resisting alloy when it is heated to the melting point of the joining material or a higher temperature, so that the composite oxide is slightly reduced, which results in the precipitation of fine metal grains in the composite oxide. The metal grains inhibit cracking of the joining material, which contributes to an improvement in the strength at room temperature.

The heat-cycle resistance can be improved by using $SiO_2$ as an oxide having a higher standard free energy of formation of an oxide than alumina and vitrifying a $SiO_2$-containing composite oxide. In this connection, when an oxide having a higher standard free energy of formation of an oxide than $SiO_2$ is incorporated, a very small amount of oxygen in the oxide can be diffused within the oxide film before the reduction of $SiO_2$ to diffuse fine metal grains in the vitrified composite oxide, which contributes to a further improvement in the heat-cycle resistance and strength at room temperature.

In this case, as with the embodiment wherein the heat-resisting alloy has no oxide film, the use of a joining material formed by mixing 50% by weight or more of a composite oxide powder having a melting point of 800° to 1,400° C. with a high-melting point oxide powder having a melting point above 1,400° C. as the balance, for example, an $Al_2O_3$ powder, and bringing the mixture to a paste form can contributes to a further improvement in the strength at room temperature.

In the present invention, the term "lanthanoid element" is intended to mean at least one element selected from elements with atomic numbers of 57 to 71.

BRIEF DESCRIPTION OF DRAWINGS

FIG. 12 is a diagram showing the relationship between the firing temperature and the vitrification in connection with FIG. 11.

BEST MODE FOR CARRYING OUT THE INVENTION

The best mode for carrying out the invention will now be described.

Figure 1:
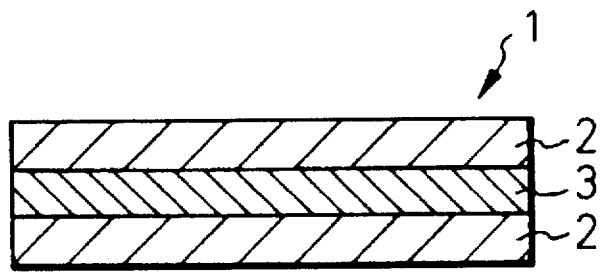
FIG. 1 is a cross-sectional view of a joined product comprising heat-resisting alloys and a composite oxide interposed between the heat-resisting alloys.

In the present invention, as shown in FIG. 1, a composite oxide 3 is interposed between heat-resisting alloys 2 facing each other, the assembly is heated to a temperature of 9/10 or more of the melting point of the composite oxide to release oxygen contained in the composite oxide, and the released oxygen reacts with an element present on the surface of the heat-resisting alloys 2 to join the heat-resisting alloys 2 to each other.

The present invention will now be described with reference to an embodiment wherein the joined heat-resisting alloy 1 is used as a metallic carrier for use in the purification of an automobile exhaust gas used in a high-temperature environment of about 800° C. and in a heat-cycling environment (with a change in temperature between room temperature and about 800° C.).

In the present invention, at the outset, oxides of at least two elements selected from the group consisting of the group Ia elements, group IIa elements, group IIIa elements, group IVa elements, group Va elements, group VIa elements, group VIIa elements, group VIII elements excluding Rh, Pd, Ir and Pt, group Ib elements excluding Ag and Au, group IIb elements excluding Hg, group IIIb elements, group IVb elements excluding C, group Vb elements excluding N, group VIb elements excluding O and S, and lanthanoid elements are selected so as to have a composition satisfying the following requirements.

(1) The oxides constituting the composite oxide should have a lower standard free energy of formation than an oxide of the elements constituting the heat-resisting alloy. This is because when use is made of a composite oxide containing, as a component, an oxide having a higher standard free energy of formation than the oxide of the elements constituting the heat-resisting alloy, this component is reduced by the element constituting the heat-resisting alloy to a metal that is diffused in the heat-resisting alloy, which makes the composition of the composite oxide different from the initial composition to give rise to a change in the melting point of the composite oxide, so that the desired properties cannot be obtained.

For example, when the heat-resisting alloy comprises an Fe—Cr alloy or a Ni—Cr alloy, an oxide having a higher ΔG than $Cr_2O_3$ cannot be used as a component of the composite oxide. Further, when the heat-resisting alloy comprises an Fe—Cr—Al alloy or a Ni—Al alloy, an oxide having a higher ΔG than $Al_2O_3$ cannot be used as a component of the composite oxide.

The melting point of the composite oxide for constituting the joining oxide should be in the range from 800° to 1,400° C. The reason why the lower limit of the melting point should be 800° C. is that since the maximum temperature in the high temperature environment is around 800° C., the composite oxide should have a melting point above this temperature to maintain the high-temperature strength. The reason why the upper limit of the melting point should be 1,400° C. will now be described.

In the metallic carrier for use in the purification of the automobile exhaust gas, a starting-stopping operation of the engine causes a heat-cycle. In order to withstand a repeated heat-cycle from room temperature to 800° C., the melting point of the composite oxide should be 1,400° C. or below. Specifically, when the melting point exceeds 1,400° C., the deformability of the composite oxide becomes unsatisfactory and, at the same time, the absorption of the thermal stress also becomes unsatisfactory, which deteriorates the heat-cycle resistance. For this reason, the upper limit of the melting point should be 1,400° C.

Figure 9:
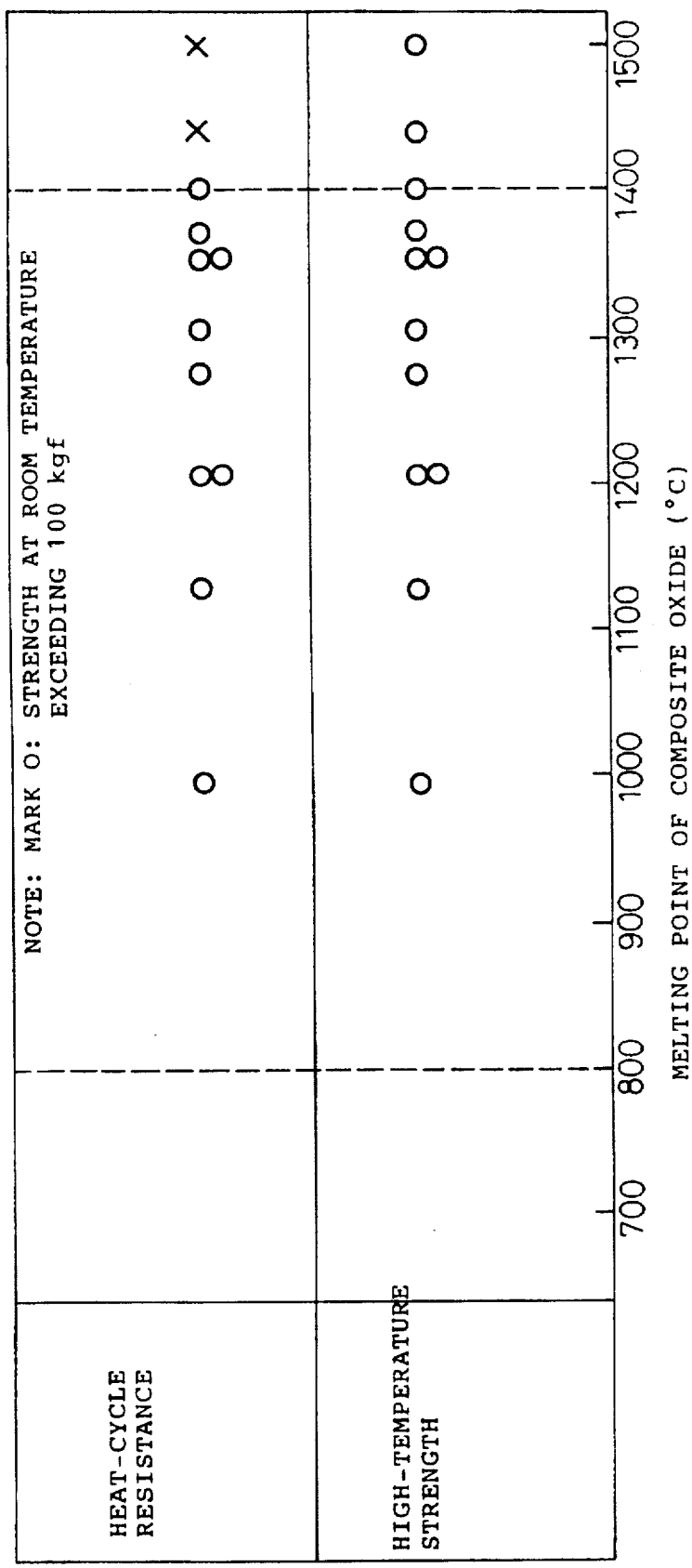
FIG. 9 is a diagram showing the relationship between the melting point of a composite oxide and the heat-cycle resistance and the high-temperature strength when the surface of the heat-resisting alloy has no oxide film and the composite oxide has a lower standard free energy of formation of an oxide than the oxide of the ingredients of the heat-resisting alloy.

FIG. 9 is a diagram showing the relationship between the high-temperature strength and the heat-cycle resistance and the melting point of the composite oxide. This diagram suggests that, in order to satisfy both requirements, it is necessary for the melting point of the composite oxide to be in the range from 800° to 1,400° C.

(2) The above-described oxide should be selected so that the joined product of heat-resisting alloys are electrically insulated from each other. For example, since the oxide TiO is electrically conductive, oxides having an electrical insulating property, such as $SiO_2$, $Al_2O_3$ and $B_2O_3$, are combined with TiO to ensure the electrical insulation (1 kΩ/50×17 $mm^2$) contemplated in the present invention.

(3) In the present invention, it is preferred to ensure a strength at room temperature of 10 kg/$cm^2$ or more at the joint. This strength at room temperature is ensured by firing a mixture comprising a combination of two or more of the above-described oxides.

When a further increase in the heat-cycle resistance and strength at room temperature among the above-described properties of the joined product of heat-resisting alloys is intended, the following requirements should be satisfied.

Figure 6:
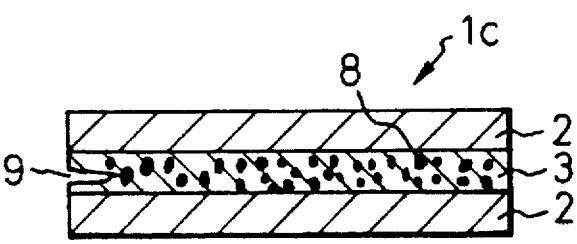
FIG. 6 is a cross-sectional view of a joint product using as an interposition a mixed powder comprising a composite oxide and a high-melting oxide.

At the outset, in order to further improve the strength at room temperature, it is preferred to use a mixed powder comprising a composite oxide powder and, added thereto, a high-melting point oxide powder having a melting point of 1,400° C. or above. This is because a comparison of the use of the mixture with the use of the composite oxide alone has revealed that, in the joined product 1c as shown in FIG. 6, the addition of a powder of a high-melting oxide 8 allows the progress of a crack 9 caused in the composite oxide 3 to be inhibited by the high-melting oxide 8, which contributes to an improvement in the strength. If this powder of high-melting oxide 8 melts during firing, it reacts with the composite oxide 3, so that a satisfactory effect cannot be attained. For this reason, the high-melting point oxide should have a melting point above 1,400° C. which is the upper limit of the firing temperature. Although alumina was used as the high-melting point oxide 8 in working examples of the present invention, use may be made of other ceramic particles.

When use is made of alloys incapable of reducing $SiO_2$ (for example, SUS430), $SiO_2$ is added as a component of the composite oxide and the composite oxide is vitrified for the purpose of improving the heat-cycle resistance.

In this connection, it is noted that, with respect to a change in viscosity at a temperature near the melting point of a crystallized composite oxide and a vitrified composite oxide, the crystallized composite oxide exhibits a rapid viscosity change, whereas the vitrified composite oxide exhibits a very slow viscosity change and hence has the effect of absorbing the thermal stress, which contributes to an improvement in the heat-cycle resistance.

Figure 10:
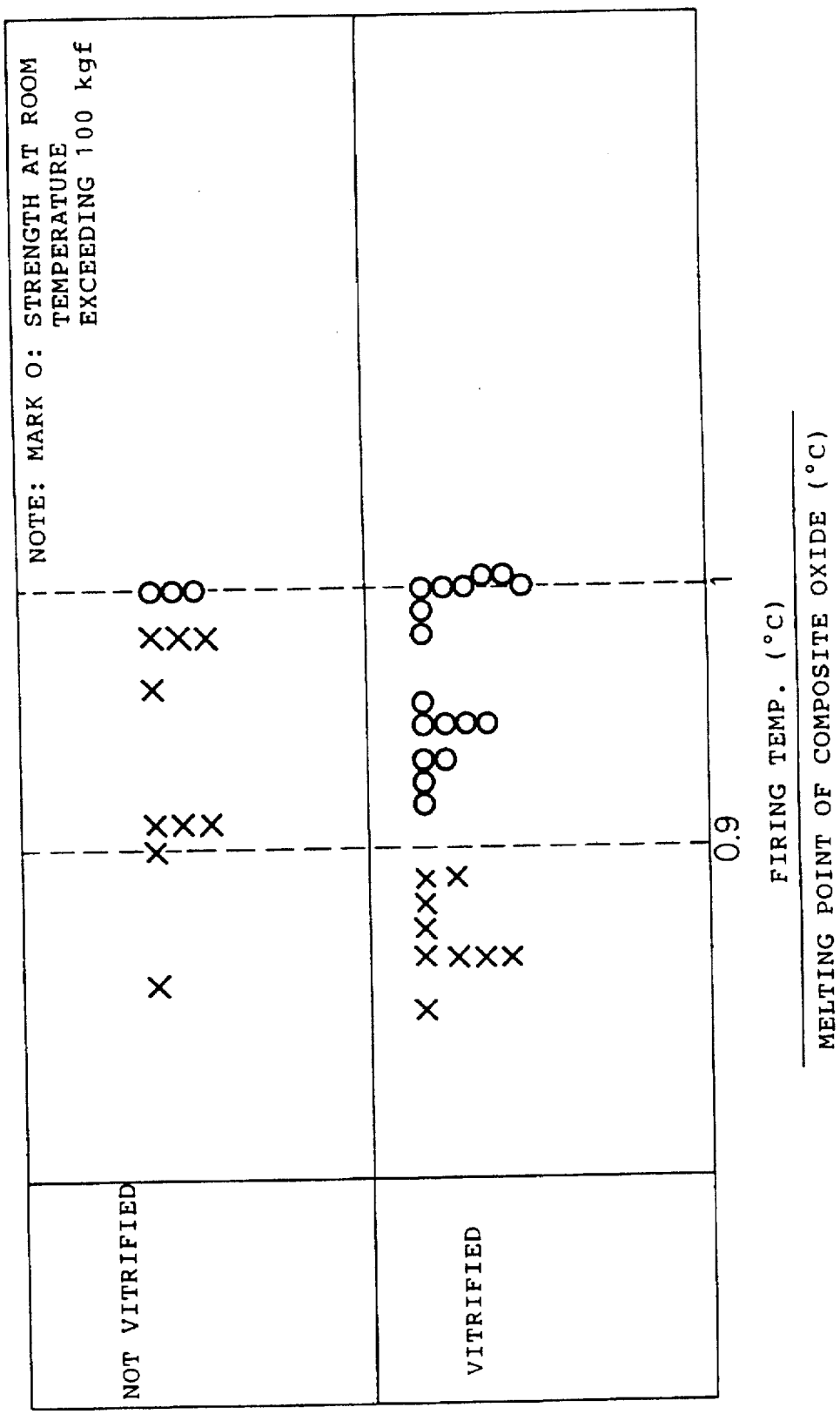
FIG. 10 is a diagram showing the relationship between the firing temperature/melting point of the composite oxide and the vitrification in connection with FIG. 9.

FIG. 10 is a diagram showing the relationship between the vitrification and the firing temperature/melting point of the composite oxide. In a composition which does not gives rise to vitrification of the oxide, the firing temperature should be above the melting point.

In the drawing, the mark ○ represents values of strength at room temperature exceeding 100 kgf.

A heat-resisting alloy having an oxide film on its surface, particularly an Al-containing heat-resisting alloy, such as an Fe—20Cr—5Al alloy having a high strength at room temperature, and an alumina film on its surface will now be described.

Figure 2:
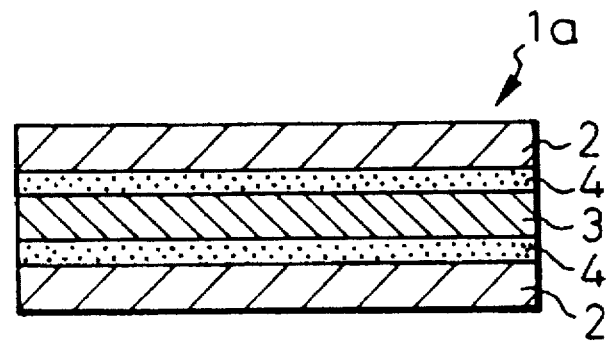
FIG. 2 is a cross-sectional view of a joined product comprising heat-resisting alloys each having an oxide film on its surface and a composite oxide interposed between the heat-resisting alloys.

When the heat-resisting alloy contains Al, i.e., is an Fe—Cr—Al alloy, a Ni—Al alloy or the like, an oxide having a higher ΔG than $Al_2O_3$ cannot be used as a component of the composite oxide. However, as shown in FIG. 2, when the heat-resisting alloy 2 is oxidized to form an alumina oxide film 4, it is possible to use as the component of the composite oxide an oxide having a higher ΔG than alumina.

The reason for this is that, since the reduction phenomenon of the composite oxide can be prevented by the oxide film, no significant change in melting point derived from a change in the composition occurs even when the oxide constituting the composite oxide does not have a lower standard free energy of formation than the oxide of the element constituting the heat-resisting alloy. In particular, when the thickness of the oxide film was 1 μm or more, the melting point of the composite oxide did not change at all.

As described above, the joining mechanism in this case is that the oxide film 4 and the composite oxide 3 are joined to each other by a reaction therebetween and the oxide film and the heat-resisting alloy substrate have a high joining strength. The reason why the alumina film has a particularly high bond strength is as follows. In the case of oxides of iron and nickel, since the oxides are formed in the interface of the oxide and gaseous phase, the film is grown outwardly, so that pores are liable to occur between the substrate and the oxide film. On the other hand, in the case of the alumina film, since the film is grown towards the inside of the alloy, no pore occurs in the film/alloy interface, which contributes to a marked increase in the adhesion.

Further, in this case, since the oxide film is an electrical insulation the joined product has an electrically insulating property even when the composite oxide is electrically conductive.

When an oxide film is formed on the surface of an Al-containing heat-resisting alloy, the higher the bond strength of the oxide film, the more significant the improvement in the joining strength. In Fe—20Cr—5Al, the strength of the bond between the oxide film and the alloy substrate is so high that the joining strength too can be improved. The addition of 0.01% or more of a lanthanoid element or a Y element to the Fe—20Cr—5Al alloy contributes to a further improvement in the adhesion of the oxide film, so that the strength of the joined product is again improved.

When an oxide having a higher standard free energy of formation of an oxide than the oxide film, that is, at least one oxide selected from the group consisting of the above-described oxides excluding oxides of Li, group IIa, group IIIa, group IVa and lanthanide elements, which are oxides having a lower free energy than alumina, was incorporated as a component of the composite oxide for the purpose of improving the strength at room temperature of the Al-containing heat-resisting alloy, an improvement in the strength at room temperature was observed.

This is because the incorporation of Al in the heat-resisting alloy causes some of the oxygen to be diffused from the composite oxide into the heat-resisting alloy through the oxide film and an oxide component having a higher standard free energy of formation of an oxide than alumina is reduced to cause precipitation of fine metal grains that are dispersed within the composite oxide. This leads to the same effect of preventing the progress of cracks as described above in connection with the embodiment wherein a powder of a mixture of a high-melting oxide is added to a composite oxide.

In this case, since the heat-resisting alloy has an oxide film on its surface, a change in the composition of the composite oxide is prevented, so that there is no possibility that the melting point of the composite oxide is changed to deteriorate the high-temperature strength and heat-cycle resistance. In particular, when the thickness of the oxide film was 1 μm or more, a deterioration in the high-temperature strength or heat-cycle resistance caused by a variation in melting point was not observed.

However, when $SiO_2$ is added in such an amount as to cause the vitrification of the composite oxide, the precipitation of Si due to the reduction of $SiO_2$ to Si causes the vitrified composite oxide to be crystallized, which often leads to a loss of heat-cycle resistance. In this case, in order to prevent the reduction of $SiO_2$, an oxide having a higher standard free energy of formation of an oxide than $SiO_2$ may be incorporated as a component of the composite oxide to preferentially precipitate this oxide. In this case, an improvement in strength at room temperature by virtue of the precipitation of the metal is observed in combination with an improvement in heat-cycle resistance by virtue of the vitrification of the composite oxide.

Figure 11:
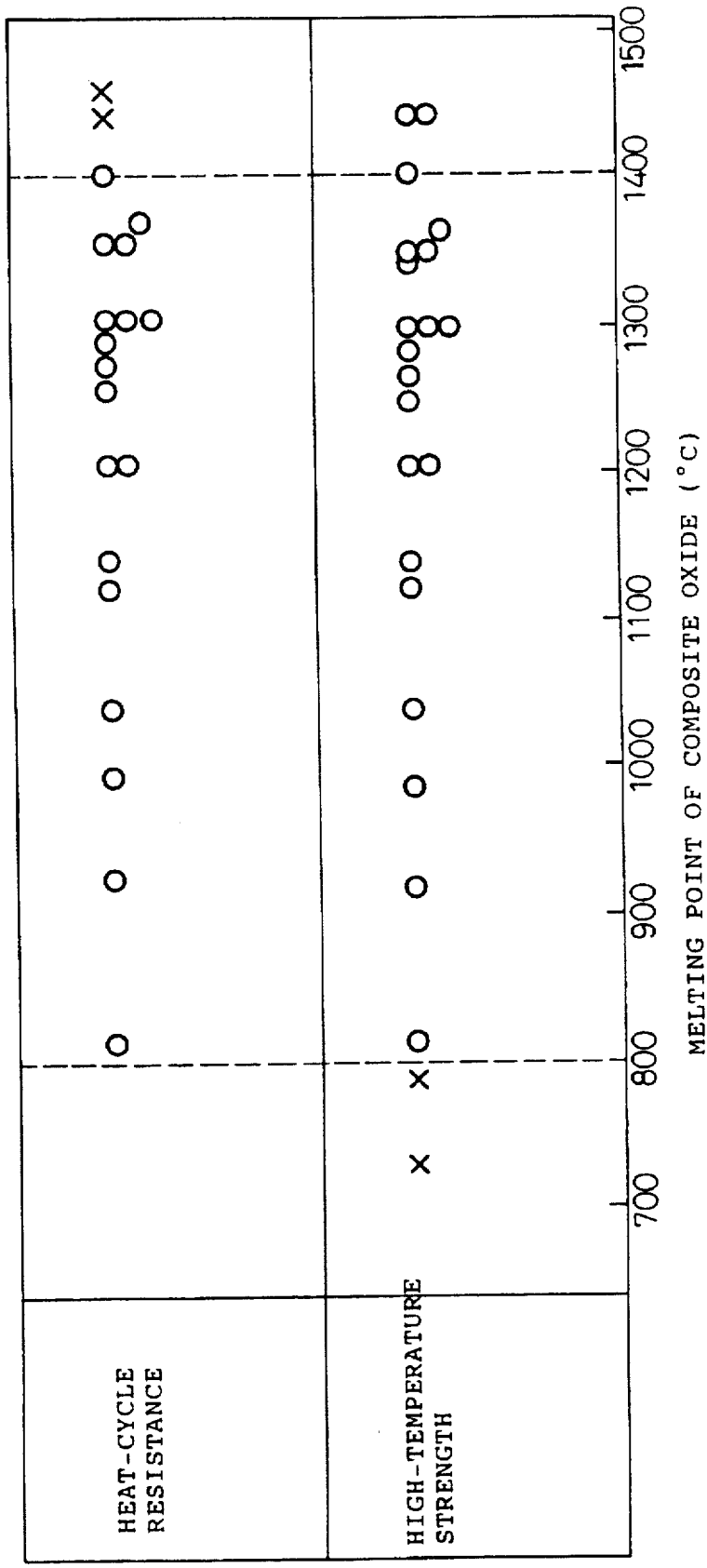
FIG. 11 is a diagram showing the relationship between the melting point of a composite oxide and the heat-cycle resistance and the high-temperature strength when the surface of the heat-resisting alloy has an oxide film.

In an embodiment wherein the heat-resisting alloy (Fe—20Cr—5Al alloy) has an oxide film on its surface, the relationship between the melting point of the composite oxide and the heat-cycle resistance and the high-temperature strength is shown in FIG. 11, and the relationship between the firing temperature/melting point of the composite oxide and the vitrification is shown in FIG. 12.

As shown in the drawings, the same effect as that shown in FIGS. 9 and 10 could be attained.

Figure 3:
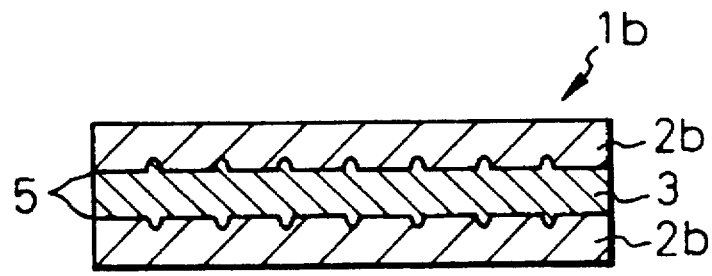
FIG. 3 is a cross-sectional view of an joined product comprising heat-resisting alloys having an uneven surface and a composite oxide interposed between the heat-resisting alloys.
Figure 4:
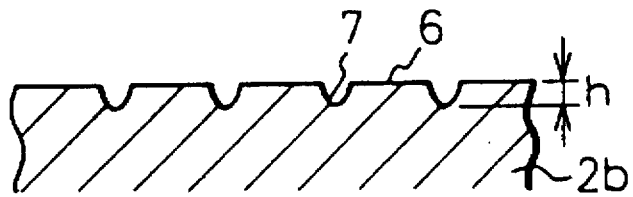
FIG. 4 is a partially sectional view of a heat-resisting alloy having an uneven surface.
Figure 5:
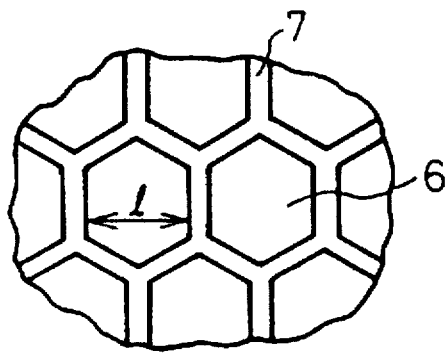
FIG. 5 is an enlarged, partial plan view of a heat-resisting alloy having an uneven surface.

In order to improve the joining strength of the heat-resisting alloy, it is useful to render the surface of the heat-resisting alloy uneven by a method such as etching with an acid. This is because, as shown in FIG. 3, the complicated structure of a joining interface 5 in a joined product 1b comprising heat-resisting alloys 2b having an uneven surface has an anchoring effect. With respect to the configuration of the uneven surface, the effect of improving the joining strength was observed when as shown FIG. 4 (a partially sectional view) and FIG. 5 (a partially plan view), the difference h in level between a protrusion 6 and a recess 7 was 3 μm or more and the distance 1 between the adjacent recesses was 100 μm or less. As shown in the above-described FIG. 2, when an oxide film is formed on the surface of the heat-resisting alloy, the surface should be roughened by the above-described surface working method prior to the oxidation treatment.

The joining method according to the present invention will now be described in more detail.

A plurality of oxides selected so as to provide a composition having the above-described various properties are melted, and the melt is homogenized and cooled and solidified to prepare a composite oxide. Oxides unstable when heated in air and oxides which are gases at room temperature are excluded from the components constituting the composite oxide. Any oxide my be used so far as it is other than the above-described unfavorable oxides and can satisfy the above-described property requirements.

Thereafter, the composite oxide is pulverized to a powder that is then kneaded with an organic vehicle to prepare a paste. The paste is coated on heat-resisting alloys in a sheet or foil form facing each other at their portion to be joined. Alternatively, when the melt is cooled, the composite oxide may be formed into a foil that is interposed between the joining portions. Thereafter, the assembly is fired (see FIG. 1).

The firing temperature necessary for providing a satisfactory strength at room temperature is 9/10 or more of the melting point (in terms of absolute temperature) of the composite oxide. This is because when the composite oxide contains $SiO_2$ in such an amount as to cause the vitrification, heating at the above temperature provides a sufficient flow of the composite oxide, so that the composite oxide 3 and the heat-resisting alloy 2 or the oxide film 4 shown in FIG. 1 or FIG. 2 react with each other all over the surface of the portion to be joined. When the firing temperature is below 9/10 of the melting point of the composite oxide, a sufficient flow of the composite oxide 3 cannot be provided, so that a high joining strength cannot be obtained. In many of the composite oxides, the softening point is below the melting point. However, when a high joining strength is desired, if the heating temperature is above the softening temperature but below 9/10 of the melting point of the composite oxide, such heating temperature is unsatisfactory from the viewpoint of fluidity of the composite oxide. For this reason, the heating at a temperature of 9/10 or more of the melting point of the composite oxide is indispensable. With respect to firing atmosphere, a vacuum atmosphere was used in the working examples of the present invention which will be described later. However, the firing atmosphere is not limited to a vacuum and may be any of a reducing atmosphere, an inert atmosphere or air.

When the composite oxide does not contain $SiO_2$ in the above-described amount, melting and bonding are effected by heating at a temperature above the composite oxide.

After the completion of the firing, the joined heat-resisting alloy 1, 1a or 1b is taken out of a firing furnace and cooled to solidify the composite oxide 3.

As described above, the present invention aims to simultaneously satisfy the four requirements of high-temperature strength, heat-cycle resistance, strength at room temperature, and electrical insulation. This aim cannot be achieved by improving any one of properties of the interposing composite oxide, alloy material or firing conditions. That is, the four requirements contemplated in the present invention can be satisfied with use of a heat-resisting alloy as the metal in combination with the optimization of properties of the interposing oxide and firing conditions.

EXAMPLES

Example 1

Composite oxides according to formulations specified in Tables 1 to 12 were completely melted and homogenized in air to provide composite oxides having melting points shown in the tables.

Figure 7:
FIG. 7 is a cross-sectional view of a heat-resisting alloy foil wherein the portion to be joined is coated with a composite oxide.

The composite oxides were pulverized with a pulverizer and further subjected to size reduction in a ball mill to an average particle diameter of 10 μm. The powders of the composite oxides 30 were kneaded with an organic vehicle to prepare pastes that were then coated by screen printing on the surface of a heat-resisting alloy foil 20 shown in FIG. 7, having a thickness of 100 μm, a length of 100 mm and a width of 17 mm in such a manner that the half of the lengthwise direction of the foil is covered with the coating.

The heat-resisting alloy foil comprised SUS430 (see Tables 1 to 4) or Fe—20Cr—5Al alloy (hereinafter referred to as "U205") (see Tables 5 to 12).

Table 12 shows the results of an experiment wherein the composite oxides specified in Table 2 were coated on the surface of U205 alloy not having an oxide film.

Figure 8:
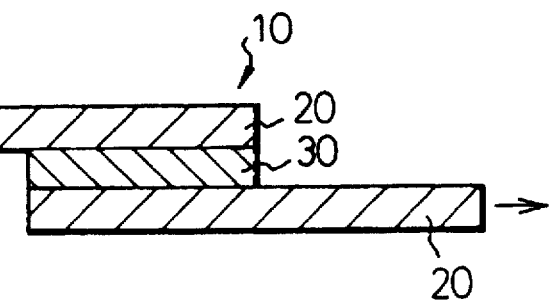
FIG. 8 is a cross-sectional view of a joined product comprising heat-resisting alloy foils and a composite oxide interposed between the heat-resisting alloy foils, wherein the arrow indicates the direction of application of a load in a strength test.

Then, the coated surfaces of the heat-resisting alloy foils were brought face to face with each other as shown in FIG. 8, fastened by a fixture, fired in a vacuum atmosphere at a predetermined temperature to prepare joined products 10.

The strength at room temperature, the high-temperature strength, the heat-cycle resistance, and the electrical insulation of the joined products 10 were evaluated, and the results are shown in the tables.

[Evaluation methods]

Strength at room temperature: A reinforcing material is adhered to the surface of the joined product remote from the joined surface, and the shearing strength is measured.

Failed at a load of less than 100 kgf: X

Withstood a load of 100 kgf or more: ○

Withstood a load of 200 kgf or more: ◎

Withstood a load of 300 kgf or more: ◎ ◎

High temperature strength: The joined product is pulled at a temperature of 800° C. or below in the direction of an arrow.

Broke at the joined portion: X

The heat-resisting alloy failed: ○

Heat-cycle resistance: The joined product is placed in a furnace of 800° C., held for 10 min and then air-cooled for 10 min. The above series of steps constitute one cycle.

The joined product failed when subjected to a load of less than 900 cycles: X

The joined product did not failed when subjected to a load of 900 cycles: ○

The joined product did not failed when subjected to a load of 1500 cycles: ◎

Electrical insulating property: The resistance value across the two heat-resisting alloy foils of the joined product is measured.

A resistance value of 1 kΩ or more: ○

In the properties shown in the tables, "—" means that the property was not measured because other properties were evaluated as x.

The results of evaluation were as follows.

Since the composite oxides listed in Table 1 each had an unvitrifiable composition, when the firing temperature was below the melting point, the strength at room temperature was less than 100 kgf, that is, the properties of the joined product according to the present invention could not be obtained.

In Tables 2 to 4, the composite oxides containing by weight of SiO$_2$ were vitrified by firing at a temperature of 9/10 or more of the melting point and provided all the four properties contemplated in the present invention.

In the joining of the alloy U205, none of the samples exhibited the intended strength at room temperature except for the joined product using a composite oxide wherein all the components constituting the composite oxide had a lower ΔG value than Al$_2$O$_3$.

The heat-resisting alloy (U205) given in Table 5 has no oxide film on its surface, and since SiO$_2$ was not contained in the composite oxide, all the properties were only evaluated as ○ when the firing was effected at the melting point of the composite oxide.

With respect to the heat-resisting alloy (U205) shown in Tables 6 to 11, the heat-resisting alloy foil was heated in air prior to joining to form an oxide film having a thickness of 0.5 to 1 μm on the surface of the foil.

The joining materials shown in Tables 6 and 7 could not be vitrified, so that the firing temperature should be the melting temperature or above. Further, since the composite oxides listed in these tables had compositions that did not give rise to precipitation of metal grains, both the heat-cycle resistance and strength at room temperature were not influenced by the thickness of the oxide film.

The joining materials shown in Table 8 could not be vitrified, so that the firing temperature should be the melting temperature or above. Further, the composite oxides gave rise to precipitation of metal grains. In sample No. 30, since the thickness of the oxide film was 0.5 μm, the heat-cycle resistance could not reach a desired level. On the other hand, in sample Nos. 31 and 33, the desired heat-cycle resistance could be provided by increasing the thickness of the oxide film from 0.5 μm to 1 μm.

The joining materials listed in Table 9 could be vitrified and provided necessary properties by firing at a temperature below the melting point. However, in sample No. 37, since the melting point exceeded 1,400° C., good heat-cycle resistance not could be obtained.

In the systems shown in Table 9, some oxide contents provided poor heat-cycle resistance. Specifically, in sample 36, when the thickness of the oxide film was 0.5 μm, the heat-cycle resistance was inferior to that of sample Nos. 34 and 35 and evaluated as ○. However, an evaluation of ⊙ could be obtained when the thickness of the oxide film was 1 μm.

The composite oxides listed in Tables 10 and 11 were vitrifiable and, at the same time, had a higher standard free energy of formation of an oxide than SiO$_2$. They provided an evaluation of ⊙ in the heat-cycle resistance when the thickness of the oxide film was 0.5 μm. However, a deterioration in the heat-cycle resistance was observed in sample No. 40 wherein the content of the oxide having the above-described standard free energy was low.

In the samples shown in Table 12, the heat-resisting alloy U205 had no oxide film on its surface, and the composite oxides contained SiO$_2$ had a standard free energy of formation of an oxide higher than Al$_2$O$_3$. In these samples, SiO$_2$ contained in the joining materials was reduced during the production of joined products to deteriorate the properties of the composite oxides, so that the strength at room temperature for all the joined products was evaluated as X.

TABLE 1

(SUS430:1)

| | No. | | 1 | | | 2 | | | 3 | | | 4 | |
|---|---|---|---|---|---|---|---|---|---|---|---|---|---|
| Kind | *CaO (wt. %) | | 46 | | | 41.5 | | | 51.5 | | | 40.5 | |
| of | *Al$_2$O$_3$ (wt. %) | | 47.7 | | | 51.8 | | | 42.3 | | | 50.5 | |
| oxide | MgO (wt. %) | | 6.3 | | | 6.7 | | | 6.2 | | | 0 | |
| Properties | Melting point (°C.) | | 1345 | | | 1345 | | | 1450 | | | 1360 | |
| | Firing temp. (°C.) | 1200 | 1300 | 1345 | 1200 | 1300 | 1345 | 1200 | 1300 | 1400 | 1200 | 1300 | 1360 |
| | Ratio of firing temp. to melting point | 0.91 | 0.97 | 1 | 0.91 | 0.97 | 1 | 0.85 | 0.91 | 0.97 | 0.90 | 0.96 | 1 |
| Strength at room temp. | Surface etching | Not done | X | X | ○ | X | X | ○ | X | X | X | X | X | ○ |
| | | Done | — | — | ⊙ | — | — | ⊙ | — | — | — | — | — | ⊙ |
| | High-temp. strength | | — | — | ○ | — | — | ○ | — | — | — | — | — | ○ |
| | Heat-cycle resistance | | — | — | ○ | — | — | ○ | — | — | — | — | — | ○ |
| | Electrical insulating property | | — | — | ○ | — | — | ○ | — | — | — | — | — | ○ |

TABLE 2

(SUS430:2)

| | No. | 5 | 6 | 7 | 8 |
|---|---|---|---|---|---|
| Kind | *CaO (wt. %) | 46 | 41.5 | 51.5 | 40.5 |
| of | *Al$_2$O$_3$ (wt. %) | 23 | 34 | 30 | 38 |
| oxide | SiO$_2$ (wt. %) | 15 | 18 | 37 | 53 |

TABLE 2-continued (SUS430:2)

| | No. | | 5 | | | 6 | | | 7 | | | 8 | |
|---|---|---|---|---|---|---|---|---|---|---|---|---|---|
| Properties | Melting point (°C.) | | 1200 | | | 1300 | | | 1400 | | | 1500 | |
| | Firing temp. (°C.) | 1000 | 1100 | 1200 | 1100 | 1200 | 1300 | 1200 | 1300 | 1400 | 1300 | 1400 |
| | Ratio of firing temp. to melting point | 0.86 | 0.93 | 1 | 0.87 | 0.94 | 1 | 0.88 | 0.94 | 1 | 0.89 | 0.94 |
| | Strength at room temp. | Surface etching | Not done | X | ○ | ○ | X | ○ | ○ | X | ○ | ○ | X | ○ |
| | | | Done | — | ⊙ | ○ | — | ⊙ | ⊙ | — | ⊙ | ⊙ | — | — |
| | High-temp. strength | | | — | ○ | ○ | — | ○ | ○ | — | ○ | ○ | — | ○ |
| | Heat-cycle resistance | | | — | ⊙ | ⊙ | — | ⊙ | ⊙ | — | ⊙ | ⊙ | — | X |
| | Electrical insulating property | | | — | ○ | ○ | — | ○ | ○ | — | ○ | ○ | — | ○ |

TABLE 3

(SUS430:3)

| | No. | | 9 | | | 10 | | | 11 | | | 12 | | |
|---|---|---|---|---|---|---|---|---|---|---|---|---|---|---|
| Kind of oxide | *CaO (wt. %) | | 38 | | | 66 | | | 55 | | | 69 | | |
| | *B₂O₃ (wt. %) | | 32 | | | 14 | | | 1 | | | 16 | | |
| | SiO₂ (wt. %) | | 30 | | | 20 | | | 44 | | | 25 | | |
| Properties | Melting point (°C.) | | 980 | | | 1270 | | | 1440 | | | 1120 | | |
| | Firing temp. (°C.) | 800 | 900 | 1000 | 1100 | 1200 | 1300 | 1200 | 1300 | 1400 | 900 | 1000 | 1100 |
| | Ratio of firing temp. to melting point | 0.86 | 0.94 | 1.02 | 0.89 | 0.95 | 1.02 | 0.86 | 0.92 | 0.98 | 0.84 | 0.91 | 0.99 |
| | Strength at room temp. | Surface etching | Not done | X | ○ | ○ | X | ○ | ○ | X | ○ | ○ | X | ○ | ○ |
| | | | Done | — | ⊙ | ⊙ | — | ⊙ | ⊙ | — | ⊙ | ⊙ | — | ⊙ | ⊙ |
| | High-temp. strength | | | — | ○ | ○ | — | ○ | ○ | — | ○ | ○ | — | ○ | ○ |
| | Heat-cycle resistance | | | — | ⊙ | ⊙ | — | ⊙ | ⊙ | — | X | X | — | ⊙ | ⊙ |
| | Electrical insulating property | | | — | ○ | ○ | — | ○ | ○ | — | ○ | ○ | — | ○ | ○ |

TABLE 4

(SUS430:4)

| | | No. | | 13 | | | | Properties | Strength at room temp. | Surface etching | Not done | X | ○ | ○ |
|---|---|---|---|---|---|---|---|---|---|---|---|---|---|---|
| Kind of oxide | Al₂O₃ (wt. %) | | | 10 | | | | | | | Done | — | ⊙ | ⊙ |
| | MnO (wt. %) | | | 45 | | | | | High-temp. strength | | | — | ○ | ○ |
| | SiO₂ (wt. %) | | | 45 | | | | | Heat-cycle resistance | | | — | ⊙ | ⊙ |
| | Melting Point (°C.) | | | 1200 | | | | | Electrical insulating property | | | — | ○ | ○ |
| | Firing temp. (°C.) | 1000 | 1100 | 1200 | | | | | | | | | | |
| | Ratio of firing temp. to melting point | 0.86 | 0.93 | 1 | | | | | | | | | | |

TABLE 5

(U205:1)

| | No. | 14 | 15 | 16 | 17 |
|---|---|---|---|---|---|
| Kind of oxide | *CaO (wt. %) | 46 | 41.5 | 51.5 | 40.5 |
| | *Al₂O₃ (wt. %) | 47.7 | 51.8 | 42.3 | 50.5 |
| | MgO (wt. %) | 6.3 | 6.7 | 6.2 | 0 |
| Properties | Melting point (°C.) | 1345 | 1345 | 1450 | 1360 |

TABLE 5-continued (U205:1)

| No. | | | 14 | | | 15 | | | 16 | | | 17 | | |
|---|---|---|---|---|---|---|---|---|---|---|---|---|---|---|
| Firing temp. (°C.) | | | 1200 | 1300 | 1345 | 1200 | 1300 | 1345 | 1200 | 1300 | 1400 | 1200 | 1300 | 1360 |
| Ratio of firing temp. to melting point | | | 0.91 | 0.97 | 1 | 0.91 | 0.97 | 1 | 0.85 | 0.91 | 0.97 | 0.90 | 0.96 | 1 |
| Strength at room temp. | Surface etching | Not done | X | X | ○ | X | X | ○ | X | X | X | X | X | ○ |
| | | Done | — | — | ⊙ | — | — | ⊙ | — | — | — | — | — | ⊙ |
| High-temp. strength | | | — | — | ○ | — | — | ○ | — | — | — | — | — | ○ |
| Heat-cycle resistance | | | — | — | ○ | — | — | ○ | — | — | — | — | — | ○ |
| Electrical insulating property | | | — | — | ○ | — | — | ○ | — | — | — | — | — | ○ |

TABLE 6

(U205:2)

| | No. | | | 18 | | | 19 | | | 20 | | | 21 | | |
|---|---|---|---|---|---|---|---|---|---|---|---|---|---|---|---|
| Kind of oxide | *CaO (wt. %) | | | | 46 | | | 41.5 | | | 51.5 | | | 40.5 | | |
| | *Al$_2$O$_3$ (wt. %) | | | | 47.7 | | | 51.8 | | | 42.3 | | | 50.5 | | |
| | MgO (wt. %) | | | | 6.3 | | | 6.7 | | | 6.2 | | | 0 | | |
| Properties | Melting point (°C.) | | | | 1345 | | | 1345 | | | 1450 | | | 1360 | | |
| | Firing temp. (°C.) | | | 1200 | 1300 | 1345 | 1200 | 1300 | 1345 | 1200 | 1300 | 1400 | 1200 | 1300 | 1360 |
| | Ratio of firing temp. to melting point | | | 0.91 | 0.97 | 1 | 0.91 | 0.97 | 1 | 0.85 | 0.91 | 0.97 | 0.90 | 0.96 | 1 |
| | Strength at room temp. | Surface etching | Not done | X | X | ○ | X | X | ○ | X | X | X | X | X | ○ |
| | | | Done | — | — | ⊙ | — | — | ⊙ | — | — | — | — | — | ⊙ |
| | High-temp. strength | | | — | — | ○ | — | — | ○ | — | — | — | — | — | ○ |
| | Heat-cycle resistance | | | — | — | ○ | — | — | ○ | — | — | — | — | — | ○ |
| | Electrical insulating property | | | — | — | ○ | — | — | ○ | — | — | — | — | — | ○ |

TABLE 7

(U205:3)

| | No. | | | | | | | |
|---|---|---|---|---|---|---|---|---|
| | 22 | | 23 | | 24 | | 25 | |
| Kind of oxide | | | | | | | | |
| Li$_2$O (wt. %) | 56 | | 16 | | 71 | | 24 | |
| TiO$_2$ (wt. %) | 44 | | 84 | | — | | — | |
| ZrO$_2$ (wt. %) | — | | — | | 29 | | 76 | |
| Properties | | | | | | | | |
| Melting point (°C.) | 1030 | | 1300 | | 732 | | 1250 | |
| Firing temp. (°C.) | 900 | 1030 | 1200 | 1300 | 700 | 800 | 1150 | 1250 |
| Ratio of firing temp. to melting point | 0.90 | 1 | 0.94 | 1 | 0.97 | 1.07 | 0.93 | 1 |
| Strength at room temp. Surface etching | | | | | | | | |
| Not done | X | ○ | X | ○ | X | ○ | X | ○ |
| Done | — | ⊙ | — | ⊙ | — | — | — | ⊙ |
| High-temp. strength | — | ○ | — | ○ | — | X | — | ○ |

TABLE 7-continued (U205:3)

| | No. | | | | | | | |
|---|---|---|---|---|---|---|---|---|
| | 22 | | 23 | | 24 | | 25 | |
| Heat-cycle resistance | — | ○ | — | ○ | — | — | — | ○ |
| Electrical insulating property | — | ○ | — | ○ | — | — | — | ○ |

TABLE 8

(U205:4)

| | No. | 26 | | 27 | | 28 | | 29 | | 30 | | 31 | | 32 | 33 | |
|---|---|---|---|---|---|---|---|---|---|---|---|---|---|---|---|---|
| Kind | *PbO (wt. %) | 96.5 | | 85 | | 92 | | — | | — | | — | | — | — | |
| of | *$Cr_2O_3$ (wt. %) | 3.5 | | 15 | | 8 | | 13 | | 24 | | 36 | | 49 | 57 | |
| oxide | BaO (wt. %) | — | | — | | — | | 87 | | 76 | | 64 | | 51 | 43 | |
| Properties | Melting point (°C.) | 787 | | 918 | | 807 | | 1140 | | 1430 | | 1280 | | 1440 | 1300 | |
| | Firing temp. (°C.) | 700 | 800 | 900 | 1000 | 800 | 900 | 1100 | 1200 | 1400 | 1430 | 1200 | 1300 | 1400 | 1200 | 1300 |
| | Ratio of firing temp. to melting point | 0.92 | 1.01 | 0.98 | 1.07 | 0.99 | 1.09 | 0.97 | 1.04 | 0.98 | 1 | 0.95 | 1.01 | 0.98 | 0.94 | 1 |
| | Strength at room temp. Surface Not done | X | ⊙ | X | ⊙ | X | ⊙ | X | ⊙ | X | ⊙ | X | ⊙ | X | X | ⊙ |
| | etching Done | — | — | — | ⊙⊙ | — | ⊙⊙ | — | ⊙⊙ | — | — | — | ⊙⊙ | — | — | ⊙⊙ |
| | High-temp. strength | — | X | — | ○ | — | ○ | — | ○ | — | ○ | — | ○ | — | — | ○ |
| | Heat-cycle resistance | — | — | — | ○ | — | ○ | — | ○ | — | X | — | X→○ | — | — | X→○ |
| | Electrical insulating property | — | — | — | ○ | — | ○ | — | ○ | — | — | — | ○ | — | — | ○ |

Note
1) Oxide film thickness: 0.5 μm, 0.5 → 1.0 μm for some oxide coatings.
2) Precipitation of metals occurred.
3) Oxide marked with *: having a higher standard free energy of formation of an oxide than $SiO_2$.

TABLE 9

(U205:5)

| | No. | 34 | | | 35 | | | 36 | | 37 | |
|---|---|---|---|---|---|---|---|---|---|---|---|
| Kind | *CaO (wt. %) | 23 | | | 34 | | | 30 | | 38 | |
| of | *$Al_2O_3$ (wt. %) | 15 | | | 18 | | | 37 | | 53 | |
| oxide | $SiO_2$ (wt. %) | 62 | | | 48 | | | 33 | | 9 | |
| Properties | Melting point (°C.) | 1200 | | | 1300 | | | 1400 | | 1500 | |
| | Firing temp. (°C.) | 1000 | 1100 | 1200 | 1100 | 1200 | 1300 | 1200 | 1300 | 1400 | 1300 | 1400 |
| | Ratio of firing temp. to melting point | 0.86 | 0.93 | 1 | 0.87 | 0.94 | 1 | 0.88 | 0.94 | 1 | 0.89 | 0.94 |
| | Strength at room temp. Surface Not done | X | ⊙ | ⊙ | X | ⊙ | ⊙ | X | ⊙ | ⊙ | X | ○ |
| | etching Done | — | ⊙⊙ | ⊙⊙ | — | ⊙⊙ | ⊙⊙ | — | ⊙⊙ | ⊙⊙ | — | — |
| | High-temp. strength | — | ○ | ○ | — | ○ | ○ | — | ○ | ○ | — | ○ |
| | Heat-cycle resistance | — | ⊙ | ⊙ | — | ⊙ | ⊙ | — | ○→⊙ | ○→⊙ | — | X |
| | Electrical insulating property | — | ○ | ○ | — | ○ | ○ | — | ○ | ○ | — | ○ |

Note:
1) oxide film thickness: 0.5 μm, 0.5 → 1 μm for some oxide coatings.
2) Precipitation of metals occurred.
3) Oxide marked with *: having a lower standard free energy of formation of an oxide than $SiO_2$.

TABLE 10

(U205:6)

| No. | | | 38 | | | 39 | | | 40 | | | 41 | | |
|---|---|---|---|---|---|---|---|---|---|---|---|---|---|---|
| Kind of oxide | *CaO (wt. %) | | 38 | | | 66 | | | 55 | | | 69 | | |
| | *B₂O₃ (wt. %) | | 32 | | | 14 | | | 1 | | | 16 | | |
| | SiO₂ (wt. %) | | 30 | | | 20 | | | 44 | | | 25 | | |
| Properties | Melting point (°C.) | | 980 | | | 1270 | | | 1440 | | | 1120 | | |
| | Firing temp. (°C.) | 800 | 900 | 1000 | 1100 | 1200 | 1300 | 1200 | 1300 | 1400 | 900 | 1000 | 1100 |
| | Ratio of firing temp. to melting point | 0.86 | 0.94 | 1.02 | 0.89 | 0.95 | 1.02 | 0.86 | 0.92 | 0.98 | 0.84 | 0.91 | 0.99 |
| | Strength at room temp. Surface etching Not done | X | ⊚ | ⊚ | X | ⊚ | ⊚ | X | ⊚ | ⊚ | X | ⊚ | ⊚ |
| | Done | — | ⊚⊚ | ⊚⊚ | — | ⊚⊚ | ⊚⊚ | — | — | — | — | ⊚⊚ | ⊚⊚ |
| | High-temp. strength | — | ○ | ○ | — | ○ | ○ | — | ○ | ○ | — | ○ | ○ |
| | Heat-cycle resistance | — | ⊚ | ⊚ | — | ⊚ | ⊚ | — | X | X | — | ⊚ | ⊚ |
| | Electrical insulating property | — | ○ | ○ | — | ○ | ○ | — | ○ | ○ | — | ○ | ○ |

Note:
1) Precipitation of metal occurred.
2) Oxide marked with *: having a high standard free energy of formation of an oxide than SiO₂.
3) Oxide film thickness: 0.5 μm.

TABLE 11

(U205:7)

| | | No. 42 | |
|---|---|---|---|
| Kind of oxide | | | |
| Al₂O₃ (wt. %) | | 10 | |
| *MnO (wt. %) | | 45 | |
| SiO₂ (wt. %) | | 45 | |
| Properties | | | |
| Melting point (°C.) | | 1200 | |
| Firing temp. (°C.) | 1000 | 1100 | 1200 |
| Ratio of firing temp. to melting point | 0.86 | 0.93 | 1 |
| Strength at room temp. Surface etching | | | |
| Not done | X | ⊚ | ⊚ |
| Done | — | ⊚⊚ | ⊚⊚ |
| High-temp. strength | — | ○ | ○ |
| Heat-cycle resistance | — | ⊚ | ⊚ |
| Electrical insulating property | — | ○ | ○ |

Note:
1) Precipitation of metals occurred.
2) Oxide film thickness: 0.5 μm.
3) Oxide marked with *: having a higher standard free energy of formation of an oxide than SiO₂.

TABLE 12

(U205:8)

| No. | | | 43 | | | 44 | | | 45 | | | 46 | | |
|---|---|---|---|---|---|---|---|---|---|---|---|---|---|---|
| Kind of oxide | *CaO (wt. %) | | 23 | | | 34 | | | 30 | | | 38 | | |
| | *Al₂O₃ (wt. %) | | 15 | | | 18 | | | 37 | | | 53 | | |
| | SiO₂ (wt. %) | | 62 | | | 48 | | | 33 | | | 9 | | |
| Properties | Melting point (°C.) | | 1200 | | | 1300 | | | 1400 | | | 1500 | | |
| | Firing temp. (°C.) | 1000 | 1100 | 1200 | 1100 | 1200 | 1300 | 1200 | 1300 | 1400 | 1300 | 1400 |
| | Ratio of firing temp. to melting point | 0.86 | 0.93 | 1 | 0.87 | 0.94 | 1 | 0.88 | 0.94 | 1 | 0.89 | 0.94 |
| | Strength at room temp. Surface etching Not done | X | X | X | X | X | X | X | X | X | X | X |
| | Done | — | — | — | — | — | — | — | — | — | — | — |
| | High-temp. strength | — | — | — | — | — | — | — | — | — | — | — |
| | Heat-cycle resistance | — | — | — | — | — | — | — | — | — | — | — |
| | Electrical insulating property | — | — | — | — | — | — | — | — | — | — | — |

Example 2

Then, the effect attained by adding a high-melting oxide powder was examined. A SUS430 foil having a thickness of 100 μm, a length of 100 mm and a width of 17 mm and an alloy U205 foil having on its surface a 1 μm-thick oxide film formed by oxidizing the surface of the foil were used as the heat-resisting alloys. A composite oxide powder having a melting point of 1200° C. and comprising $Al_2O_3$, MnO and $SiO_2$ was mixed with a predetermined amount of an alumina powder to prepare mixed powders that were coated on the above-described foils in the same manner as that of Example 1. The assemblies were fired by holding them in a vacuum atmosphere at 1,200° C. for 10 min to prepare joined products.

Thereafter, a reinforcing material was adhered to the joined product at its surface remote from the joined surface, and a load was applied to the direction of an arrow to determine a load that led to failure of the joined product. One example of the results is given in table 13. As is apparent from the table, the samples having an alumina content of 50% by weight or less exhibited an improvement in the joining strength.

TABLE 13

| Double oxide:alumina ratio (weight ratio) | 100:0 | 80:20 | 60:40 | 50:50 | 40:60 |
| --- | --- | --- | --- | --- | --- |
| SUS430 foil used (kgf) | ○ | ⊙ | ⊙ | ⊙ | X |
| Oxidized alloy U205 used (kgf) | ⊙ | ⊙⊙ | ⊙⊙ | ⊙⊙ | X |

Example 3

A foil comprising alloy U205 and, added thereto, 0.01% by weight of each of La and Ce, a foil comprising alloy U205 and, added thereto, 0.01% by weight of Y, a foil of Inconel 1700 as a Ni-base ultrahigh heat-resisting alloy and a foil of Ni—20Cr—10Al were subjected to an oxidation treatment to form a 1 μm-thick oxide film on their surface. A composite oxide comprising $10Al_2O_3$-45MnO—$45SiO_2$ having a melting point of 1,200° C. was coated on the surface of each foil, and the assemblies were fired in a vacuum atmosphere at 1,200° C. for 10 min to prepare joined products.

Thereafter, the load which led to failure of the joined product was determined. Separately, samples prepared in the same manner as that described just above were subjected to a heat-cycle test in the same manner as that of Example 1. In the heat-cycle test, all the samples did not fail when subjected to a load of 1,500 cycles. Evaluation of the strength was ⊙ ⊙ for the joined product using a foil comprising alloy U205 and, added thereto, 0.01% by weight of each of La and Ce and ⊙ for the other joined products.

Industrial Applicability

As described above in detail, the prevent invention can provide a joined product of heat-resisting alloys capable of simultaneously satisfying the electrical insulation, high-temperature strength, strength at room temperature, and heat-cycle resistance requirements, which has been unattainable in the prior art, so that the present invention can be applied to an insulating material in a preheating type metallic carrier for the purification of an automobile exhaust gas that needs the above-described properties.

We claim:

1. A joined product having a high temperature strength sufficient to withstand a temperature of 800° C. and a heat cycle resistance sufficient to withstand repeated heat cycles from room temperature to 800° C. comprising alloy sheets or foils containing Al and having a surface covered with an oxide film consisting essentially of alumina, said oxide film having a thickness of 0.5 μm or more, said alloy sheets or foils being joined to each other at said surface covered with said oxide film with a composite oxide having a melting point in the range of from 800° to 1400° C.,
   wherein said composite oxide comprises oxides of at least two elements selected from the group consisting of group Ia elements, group IIa elements, group IIIa elements, group IVa elements, group Va elements, group VIa elements, group VIIa elements, group VIII elements excluding Rh, Pd, Ir and Pt, group Ib elements excluding Ag and Au, group IIb elements excluding Hg, group IIIb elements, group IVb elements excluding C, group Vb elements excluding N, group VIb elements excluding O and S, and lanthanoid elements, and
   wherein at least one of said at least two elements has higher standard free energy of formation of an oxide than $Al_2O_3$.

2. The joined product according to claim 1, wherein said composite oxide contains $SiO_2$ and at least one oxide having a higher standard free energy of formation of an oxide than $SiO_2$.

3. The joined product according to claim 1, wherein said composite oxide comprises 50% by weight of a composite oxide having a melting point in the range of from 800° to 1,400° C. and an oxide having a melting point above 1,400° C.

4. The joined product according to claim 1, wherein said alloy comprises an Fe—20Cr—5Al-base stainless steel.

5. The joined product according to claim 1, wherein said alloy comprises an Fe—20Cr—5Al-base stainless steel and, added thereto, 0.01 to 0.5% by weight of a lanthanoid element or a yttrium.

6. The joined product according to claim 1, wherein a lanthanoid element or yttrium is implanted into said heat-resisting alloy sheet or foil at its surface portion.

7. The joined product according to claim 1, wherein said alloy sheet or foil has an uneven surface having a difference in level between a protrusion and a recess of 3 μm or more and a distance between the adjacent recesses of 100 μm or less.

8. The joined product according to claim 1, wherein the thickness of the oxide film on the surface of said alloy is 1 μm or more.

9. The joined product according to any one of claims 1, 5 or 6, wherein said lanthanoid element is at least one member selected from the group consisting of elements with atomic numbers of 57 to 71.

10. The joined product according to claim 1, wherein said alloy sheet or foil constitutes a metallic carrier for use in the purification of an automobile exhaust gas.

11. A method for joining alloys to form a joined product having a high temperature strength sufficient to withstand a temperature of 800° C. and a heat cycle resistance sufficient to withstand repeated heat cycles from room temperature to 800° C. comprising the steps of:
   heating an alloy containing Al in a sheet or foil form in an oxidizing atmosphere thereby forming an oxide film consisting essentially of alumina on its surface, said oxide film having a thickness of 0.5 μm or more;
   placing a composite oxide having a melting point of 800° to 1400° C. on a surface of a first sheet or foil of said alloy containing Al having said oxide film formed thereon at a selected location for formation of a joint;
   forming an assembly by placing another sheet or foil of said alloy containing Al having said oxide film formed thereon on said surface of said first sheet or foil having said composite oxide placed thereon;

heating said assembly at a temperature of 9/10 or more of said composite oxide melting point thereby joining said alloy sheets or foils to each other;

said composite oxide comprising oxides of at least two elements selected from the group consisting of group Ia elements, group IIa elements, group IIIa elements, group IVa elements, group Va elements, group VIa elements, group VIIa elements, group VIII elements excluding Rh, Pd, Ir and Pt, group Ib elements excluding Ag and Au, group IIb elements excluding Hg, group IIIb elements, group IVb elements excluding C, group Vb elements excluding N, group VIb elements excluding O and S, and lanthanoid elements; and wherein at least one of said at least two elements has a higher standard free energy of formation of an oxide than $Al_2O_3$.

12. The method according to claim 11, wherein 50% by weight of said composite oxide having a melting point of 800° to 1,400° C. and a powder of a high-melting point oxide having a melting point above 1,400° C. are kneaded with each other to prepare a composite oxide in a paste form that is coated on the surface of the portion to be joined.

13. The method according to claim 11, wherein said composite oxide contains $SiO_2$ and at least one oxide having a higher standard free energy of formation of an oxide than $SiO_2$.

14. The method according to claim 11, wherein said alloy comprises an Fe—20Cr—5Al-base stainless steel.

15. The method according to claim 11, wherein 0.01 to 0.5% by weight of a lanthanoid element or yttrium are added to the Fe—20Cr—5Al-base stainless steel.

16. The method according to claim 11, wherein a lanthanoid element or yttrium is implanted into said alloy sheet or foil at its surface portion.

17. The method according to claim 11, wherein said alloy sheet or foil has an uneven surface having a difference in level between a protrusion and a recess of 3 µm or more and a distance between the adjacent recesses of 100 µm or less.

18. The method according to claim 11, wherein the thickness of the oxide film on the surface of said alloy is 1 µm or more.

19. The method according to claim 11, wherein said lanthanoid element is at least one member selected from the group consisting of elements with atomic numbers of 57 to 71.

20. The method according to claim 11, wherein said alloy sheet or foil constitutes a metallic carrier for use in the purification of an automobile exhaust gas.

* * * * *

UNITED STATES PATENT AND TRADEMARK OFFICE
CERTIFICATE OF CORRECTION

PATENT NO. : 5,679,464
DATED : October 21, 1997
INVENTOR(S) : Shogo KONYA, et al.

It is certified that error appears in the above-indentified patent and that said Letters Patent is hereby corrected as shown below:

Column 2, line 4, change "sufficint" to --sufficient--.

Column 2, line 5, change "sufficint" to --sufficient--.

Column 4, line 37, change "contributes" to --contribute--.

Column 4, line 51, change "an" to --a--.

Column 6, line 7, change "from800°" to --from 800 --.

Column 8, line 64, after "shown" insert --in--.

Column 9, line 14, change "my" to --may--.

Column 10, line 50, change "failed" to --fail--.

Column 10, line 52, change "failed" to --fail--.

Column 11, line 1, before "by" insert --20%--.

Column 12, line 6, change "not could" to --could not--.

Column 12, line 26, before "contained" insert --which--.

Column 21, line 55, change "prevent" to --present--.

UNITED STATES PATENT AND TRADEMARK OFFICE
CERTIFICATE OF CORRECTION

PATENT NO. : 5,679,464
DATED : October 21, 1997
INVENTOR(S) : Shogo KONYA, et al.

It is certified that error appears in the above-indentified patent and that said Letters Patent is hereby corrected as shown below:

```
Column 22, line 17, after "has" insert --a--.

Column 22, line 34, delete "a".

Column 24, line 18, after "11," insert --15 or 16,--.
```

Signed and Sealed this

Eighteenth Day of August, 1998

Attest:

BRUCE LEHMAN

Attesting Officer

Commissioner of Patents and Trademarks